United States Patent
Cho et al.

(10) Patent No.: US 6,552,769 B2
(45) Date of Patent: Apr. 22, 2003

(54) METHOD FOR FABRICATING LIQUID CRYSTAL DISPLAY PANEL WITH SEALANT ON BOTH SIDES OF A PERIPHERAL GROOVE

(75) Inventors: So Haeng Cho, Taegu-kwangyokshi (KR); In Jae Chung, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 6 days.

(21) Appl. No.: 09/973,787

(22) Filed: Oct. 11, 2001

(65) Prior Publication Data

US 2002/0044232 A1 Apr. 18, 2002

(30) Foreign Application Priority Data

Oct. 12, 2000 (KR) .................................. P2000-60042

(51) Int. Cl.$^7$ ............................................ G02F 1/1339
(52) U.S. Cl. ....................................... 349/153; 349/187
(58) Field of Search ......................................... 349/153

Primary Examiner—Robert H. Kim
Assistant Examiner—T L Rude
(74) Attorney, Agent, or Firm—Morgan, Lewis & Bockius LLP

(57) ABSTRACT

Disclosed is a method for fabricating a liquid crystal display panel that has an improved picture quality by preventing stains due to impurities and ionic materials. The method includes the steps of preparing a TFT substrate having a plurality of electrodes; preparing a color filter substrate having a color filter layer, a black matrix layer, and an overcoat layer; forming a groove adjacent an edge of the overcoat layer of the color filter substrate; forming a double sealant at the sides of the groove in the overcoat layer; forming a liquid crystal layer on at least one of the TFT substrate and the color filter substrate; and attaching the TFT substrate to the color filter substrate.

10 Claims, 4 Drawing Sheets

METHOD FOR FABRICATING LIQUID CRYSTAL DISPLAY PANEL WITH SEALANT ON BOTH SIDES OF A PERIPHERAL GROOVE

This application claims the benefit of Korean Applications No. P2000-0060042, filed in Korea on Oct. 12, 2000, which is hereby incorporated by reference.

BACKGROUND OF THE INVENTION

1. Field of the Invention

The present invention relates to a liquid crystal display (LCD) panel, and more particularly, to a method for fabricating a liquid crystal display panel.

2. Discussion of the Related Art

A rapid development in the information and communication field has caused an increasing demand for thin, light-weight and low cost display devices for displaying information. Display development industries are responding to this need by placing high emphasis on development of flat panel type displays.

Historically, the Cathode Ray Tube (CRT) has been widely used in application for display devices, such as televisions, computer monitors, and the like. This is because CRT screens can display various colors with high brightness. However, the CRT cannot adequately satisfy the present demand for display applications that require a reduced volume/weight, improved portability, and lower power consumption as well as a large screen size and high resolution. To respond to this need, the display industry has placed high emphasis on developing flat panel displays to replace the CRT. Over the recent years, flat panel displays have found wide use in monitors for computers, spacecraft, and aircraft, etc.

Examples of flat panel display types currently used include the LCD, the electroluminescent display (ELD), the field emission display (FED), and the plasma display panel (PDP).

Characteristics required for an ideal flat panel display include a light weight, high luminance, high efficiency, high resolution, high speed response time, low driving voltage, low power consumption, low cost, and natural color.

In forming an LCD device, a sealant is applied to a first substrate that has a color filter, and the sealant is used as a sealing material at a later time. A spacer is dispersed on a second substrate having electrodes to define a proper cell gap with respect to the first substrate having the color filter. Then, the two glass substrates are attached to each other by using the sealant, and a liquid crystal is inserted therebetween.

To inject the liquid crystal, the cell defined by the two substrates is vacuumed, and the liquid crystal is inserted into the cell by utilizing a pressure difference. Thus, the liquid crystal is dispersed under a reduced pressure condition.

In more detail, the liquid crystal is injected between first and second substrates of the panel utilizing a pressure difference created by a vacuum chamber, as follows. First, the liquid crystal display panel with the sealant is located in the vacuum chamber, and the pressure is gradually reduced so that the interior of the liquid crystal display panel assumes a low pressure state close to the vacuum pressure. Then, while the interior of the liquid crystal display panel is maintained at the low pressure state, a liquid crystal injection hole is made in contact with the liquid crystal within the vacuum chamber. Then, the air is introduced into the chamber, causing the pressure at the outside of the pannel in the vacuum chamber to gradually increase. This way, a pressure difference is created between the interior and the exterior of the panel. Due to this pressure difference, the liquid crystal is injected into the interior of the panel that is in the vacuumed state. As a result, a liquid crystal layer is formed between the first and second substrates.

FIG. 1 is a sectional view of a liquid crystal display panel according to the related art. As shown in FIG. 1, a liquid crystal display panel includes a first substrate 11, a second substrate 11a, and a sealant 13 attaching the first substrate 11 to the second substrate 11a.

The first substrate 11 is referred to as a TFT (Thin Film Transistor) substrate, and includes pixel regions defined by mutually crossing data lines and gate lines on an active region of the first substrate 11; a TFT at each intersection of the data lines and the gate lines, serving as a switching device; and a pixel electrode connected to a drain electrode of the TFT in a pixel region.

The second substrate 11a is referred to as a color filter substrate, and includes a color filter layer for displaying colors R (Red), G (Green), and B (Blue) on an active region of the second substrate 11a; a black matrix layer 15 for preventing light from impinging upon the TFT, data lines, and the gate lines; and an overcoat layer 17 on the entire surface of the insulating substrate including the black matrix layer 15 and a color filter layer.

Once these patterns are formed on the first and second substrates 11 and 11a, respectively, a spacer is dispersed on the first substrate 11 to maintain a constant gap between the first and second substrates 11 and 11a. A sealant 13 is applied to the peripheral of the second substrate 11a, and the first and second substrates 11 and 11a are attached to each other. A liquid crystal material is injected into the cell gap via an liquid crystal injection hole using a vacuum chamber as described above. This completes the related art method of fabricating a liquid crystal display panel.

However, in this method, a large amount of impurities and ionic materials is generated when the first and second substrates are attached to each other. These impurities and ionic materials remain in the panel, and cause stains in the panel, degrading the picture quality.

SUMMARY OF THE INVENTION

Accordingly, the present invention is directed to a method for fabricating a liquid crystal display panel that substantially obviates one or more of the problems due to limitations and disadvantages of the related art.

An object of the present invention is to provide a method for fabricating a liquid crystal display panel, which prevents generation of stains due to the liquid crystal injection process, thereby providing a liquid crystal display having an improved picture quality.

Additional advantages, objects, and features of the invention will be set forth in part in the description which follows, and in part will become apparent to those having ordinary skill in the art upon examination of the following description, or may be learned from practice of the invention.

The objectives and other advantages of the invention will be realized and attained by the scheme particularly pointed out in the written description and claims hereof as well as the appended drawings.

To achieve these and other advantages and in accordance with the purpose of the present invention, as embodied and broadly described herein, the present invention provides, in one aspect, a method for fabricating a liquid crystal display panel, including the steps of preparing a TFT substrate having a plurality of electrodes; preparing a color filter substrate having a color filter layer, a black matrix layer, and an overcoat layer; forming a groove adjacent an edge of the overcoat layer of the color filter substrate; forming a double sealant at the sides of the groove in the overcoat layer; forming a liquid crystal layer on at least one of the TFT substrate and the color filter substrate; and attaching the TFT substrate to the color filter substrate.

In another aspect, the present invention provies a method for fabricating a liquid crystal display pannel, including the steps of preparing a TFT substrate having a plurality of electrodes; preparing a color filter substrate having a color filter layer, a black matrix layer, and an overcoat layer; forming a groove adjacent an edge of the overcoat layer of the color filter substrate; forming double sealants at both sides of the groove in the overcoat layer; attaching the TFT substrate to the color filter substrate, the attached TFT substrate and the color filter substrate defining a cell; and forming a liquid crystal layer that fills the cell defined by the TFT substrate and the color filter substrate.

In the method for fabricating a liquid crystal display panel according to these aspects of the present invention, an exhaust port is provided in the form of a groove on the color filter substrate in order to exhaust impurities and ionic materials introduced by the liquid crystal injection, thereby preventing generation of undesirable stains.

In another aspect, the present invention provides a method for fabricating a liquid crystal display panel, including the steps of preparing a first substrate having a groove on a surface at the periphery; forming sealant ridges at both sides of the groove on the first substrate; preparing a second substrate; coating a liquid crystal on at least one of said surface of the first substrate and a surface of the second substrate; and attaching the first substrate to the second substrate so that the surface of the first substrate having the groove faces the second substrate and that the top of each sealant ridge on the first substrate is attached to the second substrate to seal the liquid crystal.

In a further aspect, the present invention provides a liquid crystal display panel, including a first substrate having a groove on a surface at its periphery; a second substrate that is coupled to the first substrate via sealants, the surface of the first substrate having the groove facing the second substrate, the sealants being disposed along and at both sides of the groove; and a liquid crystal between the first substrate and the second substrate, the liquid crystal being sealed via the sealants.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
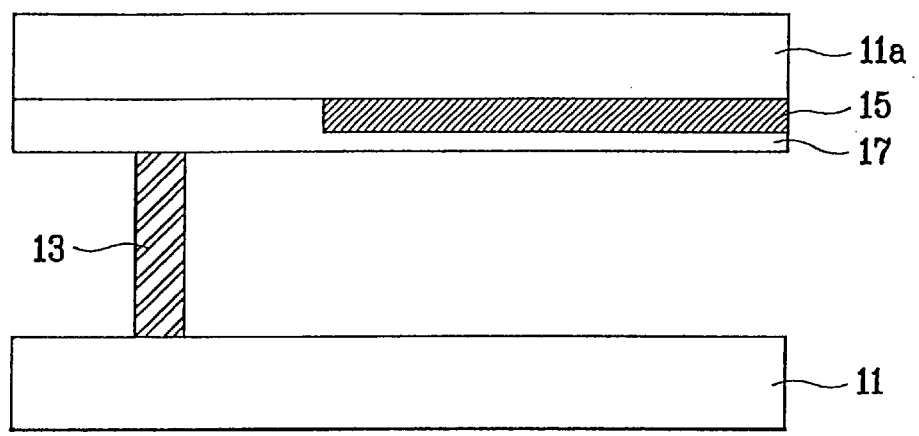
FIG. 1 is a sectional view of a related art liquid crystal display panel.
Figure 2:
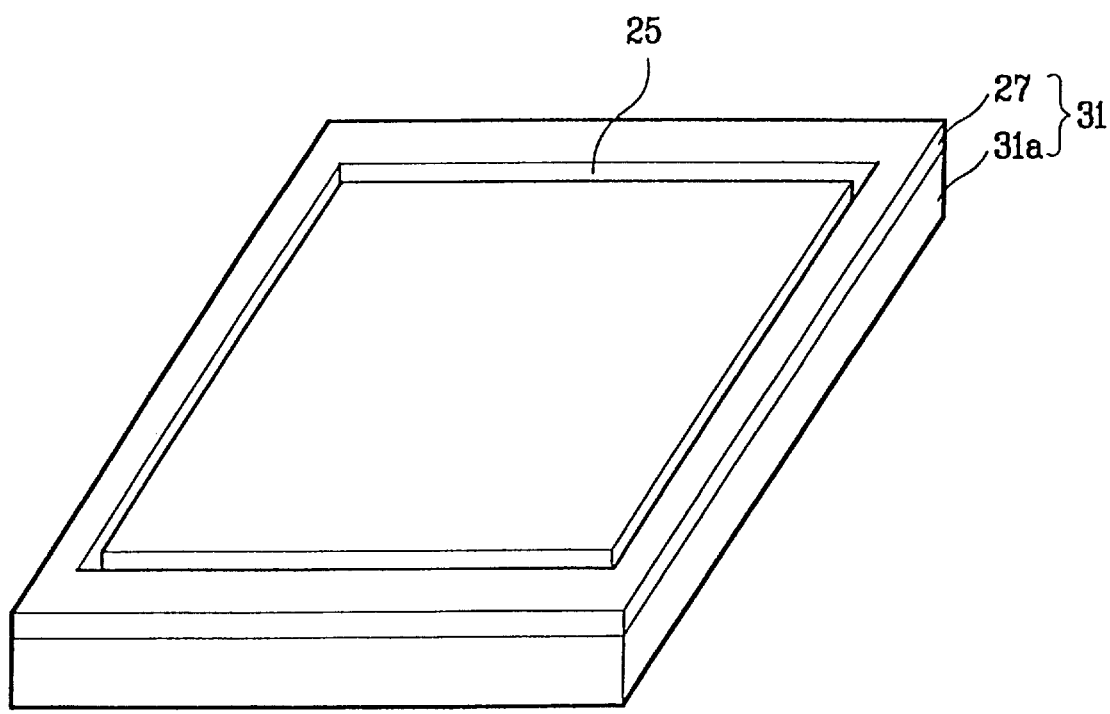
FIG. 2 is a perspective view of a color filter substrate according to an embodiment of the present invention.
Figure 3:
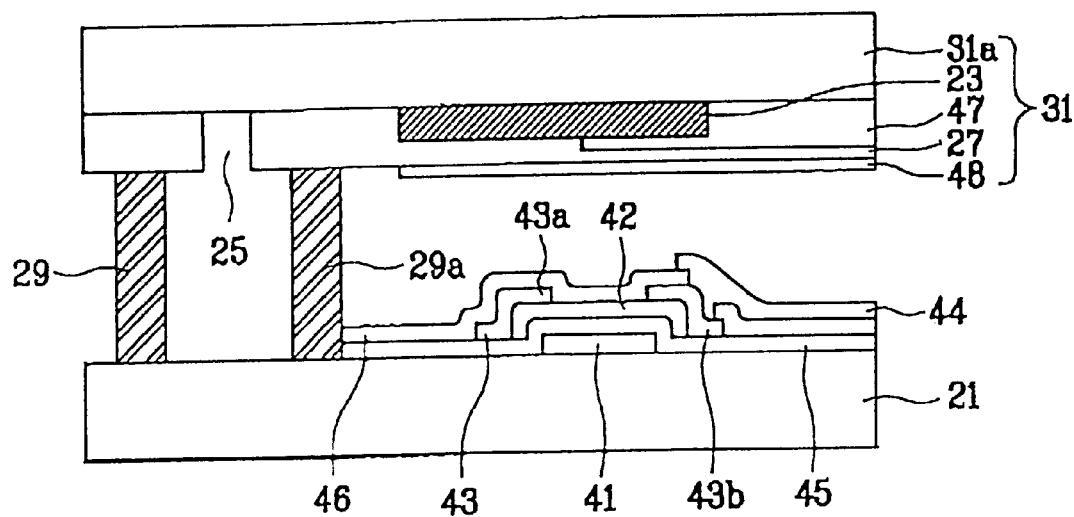
FIG. 3 is a sectional view of a liquid crystal display panel according to an embodiment of the present invention.

FIG. 2 is a perspective view of a color filter substrate according to an embodiment of the present invention, and FIG. 3 is a sectional view of a liquid crystal display panel according to this example of the present invention.

As shown in FIG. 2, the color filter substrate 31 includes an insulating substrate 31a; an overcoat layer 27 formed on the insulating substrate 31a; and a groove 25 formed along the periphery of the insulating substrate 31a. A color filter and a common electrode are formed in the active region of the panel. Also, a black matrix layer for shielding light is formed along the periphery of the active region and in the active region.

As shown in FIG. 2, the groove 25 is formed in the overcoat layer 27 at the periphery of the liquid crystal display panel. The groove 25 is used as exhaust ports for exhausting impurities and ionic materials between the color filter substrate and the TFT (Thin Film Transistor) substrate, which are generated in the process of attaching the color filter substrate to the TFT substrate.

FIG. 3 is a sectional view of the liquid crystal panel of the present example. As shown in FIG. 3, the liquid crystal display panel includes a TFT substrate 21, the color filter substrate 31, and sealants 29 and 29a for attaching the TFT substrate 21 to the color filter substrate 31.

On the TFT substrate 21, a plurality of data lines 43 and a plurality of gate lines are arranged to cross each other, defining a plurality of pixel regions. A TFT is disposed at each intersection of the data lines 43 and the gate lines. Each TFT includes a gate electrode 41, a semiconductor layer 42, and source and drain electrodes 43a, 43b. The gate electrode 41 branches off from the gate lines. A pixel electrode 44 connected to the drain electrode 43b of the TFT is formed in each pixel region.

On the color filter substrate 31, a color filter layer 47 for displaying colors R, G, and B is formed in the active region. A black matrix layer 23 is formed as a matrix arrangement to prevent light transmission at the periphery of the active region, the data lines 43, gate lines, and at the TFTs. An overcoat layer 27 having a groove 25 is formed on the entire surface of the insulating substrate 31a including the black matrix layer 23. Also, a common electrode layer 48 made of Indium Tin Oxide (ITO) is formed on the overcoat layer 27 at the active region.

As shown in FIG. 3, the TFT substrate 21 and the color filter substrate 31, on which the respective patterns are formed, are attached by double sealants 29 and 29a situated at the left and right sides, respectively, of the groove 25. Also, a liquid crystal layer is formed between the TFT substrate 21 and the color filter substrate 31, and is sealed by the double sealant 29 and 29a. Here, one of the double sealants is intentionally opened, and impurities and ionic materials in the liquid crystal layer are exhausted to the groove 25.

A method for fabricating a liquid crystal display panel according to an embodiment of the present invention will be explained with reference to FIGS. 4A to 4E.

Figure 4A:
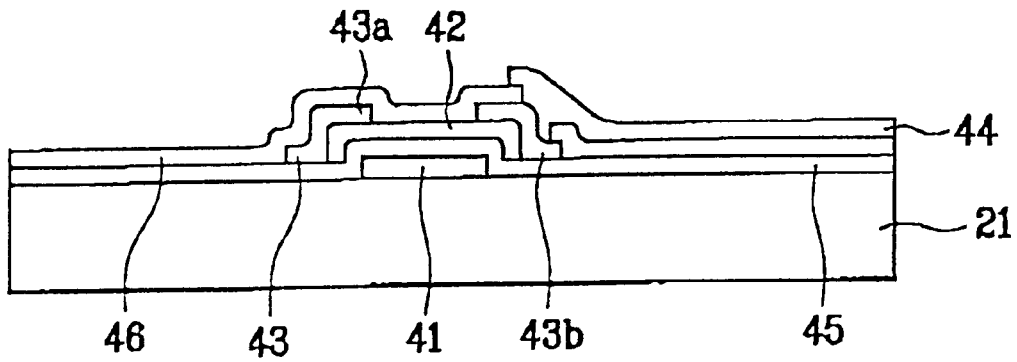
FIGS. 4A to 4E are sectional views illustrating a method for fabricating a liquid crystal display panel according to an embodiment of the present invention.

In FIG. 4A, a TFT substrate 21 is prepared. Data lines 43, gate lines (including gate electrodes 41), TFTs, and pixel electrodes 44 are formed in the TFT substrate 21. An example of the formation method of the TFT substrate 21 includes the following steps. First, a metal, such as Al, Mo, Cr, Ta or Al alloy, is sputtered onto the substrate and patterned to form gate lines and gate electrodes 41 of TFTs in the active region. SiNx or SiOx, for example, is deposited by a chemical vapor deposition over the entire surface of the glass substrate including the gate lines and the gate electrodes 41 to form a gate insulating film 45. Then, a semiconductor layer 42, which is used to create a TFT channel, is formed on the gate insulating film 45 above the gate electrode 41.

Subsequently, a metal, such as Al, Mo, Cr, Ta or Al alloy, is deposited and patterned to form data lines 43 crossing the gate lines. Then, the source and drain electrodes 43a, 43b of each TFT are formed on the semiconductor layer 42. Thereafter, a passivation film 46 is formed on the entire surface of the substrate including the source and drain electrodes 43a, 43b, and a contact hole is formed to expose the drain electrode 43b for each TFT. For each TFT, a pixel electrode 44 is formed on the passivation film 46 to be connected with the drain electrode 43b through the contact hole, thereby completing the TFT substrate 21.

Figure 4B:
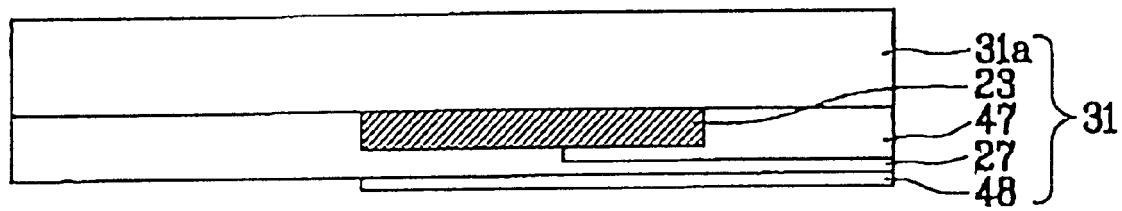

In FIG. 4B, a color filter substrate 31 is prepared. The color filter substrate 31 of this example includes a color filter layer 47, a black matrix layer 23, and an overcoat layer 27. For example, R, G, and B color filter patterns are formed in the active region of the insulating substrate 31a by steps of dying, dispersing, electrodepositing, and printing, etc., for example. Then, a black matrix layer 23 is formed in order to prevent light from impinging upon regions other than the pixel electrode. An overcoat layer 27 is formed on the entire surface of the insulating substrate 31a including the black matrix layer 23 to planarize the R, G, and B color filter and black matrix patterns. Then, a common electrode 48 is formed on the overcoat layer 27 at the active region. The commmon electrod 48 is for applying a voltage to the liquid crystal layer. This completes the color filter substrate 31. Here, the overcoat layer 27 may be formed of an acryl-based resin or a polyimide-based resin, for example.

Figure 4C:
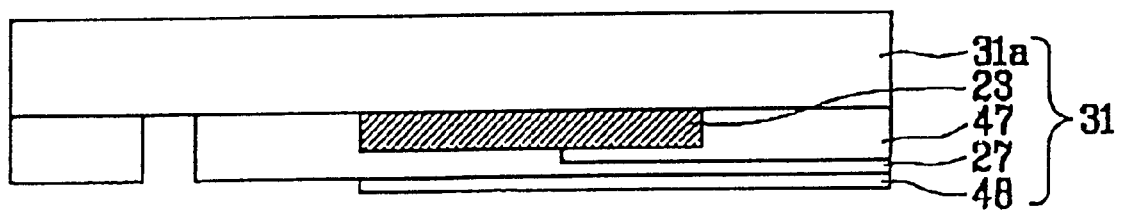

Subsequently, as shown in FIG. 4C, a portion adjacent to the edge of the overcoat layer 27 in the color filter substrate 31 is selectively removed, forming a groove 25 of a stripe shape along the periphery of the liquid crystal display panel (See also FIG. 2). The groove 25 will be used as exhaust ports for exhausting impurities and ionic materials generated when a liquid crystal layer is formed and the two substrate are attached to each other.

Figure 4D:
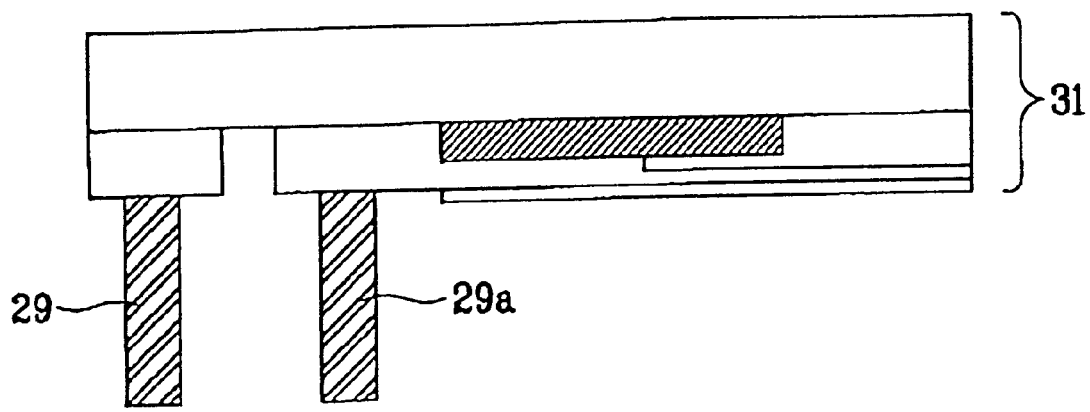

Next, a spacer is dispersed on the TFT substrate 21 to define a constant cell gap. Also, as shown in FIG. 4D, a double sealant (29 and 29a) is formed on the overcoat layer 27 at the right and left sides, respectively, of the groove 25.

Figure 4E:
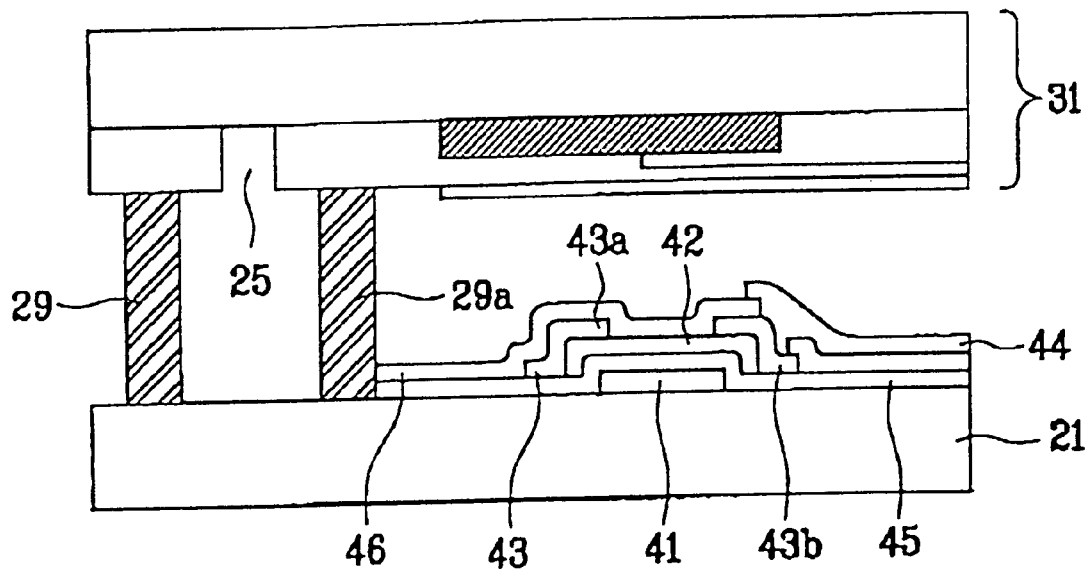

Finally, a liquid crystal is dispersed and coated on at least one of the TFT substrate and the color filter substrate in a vacuum chamber. Then, as shown in FIG. 4E, the TFT substrate 21 and the color filter substrate 31 are attached to each other, thereby completing a liquid crystal display panel according to the present example. Impurities and ionic materials that are generated when the TFT substrate 21 and the color filter substrate 31 are attached to each other and other impurities in the chamber are exhausted through the groove 25 formed on the overcoat layer 27. In other words, in this invention, the impurities and ionic materials are exhausted to the groove 25 when the two substrates are attached to each other in the chamber. A subsequent process of scribing the panel and breaking a peripheral portion of the panel may be provided. In such a case, the impurities and ionic materials in the groove 25 are removed when the substrates are scribed and broken.

The method for fabricating a liquid crystal display panel according to the present invention has the following advantages. Since the exhaust port is formed at an edge of the overcoat layer to exhaust impurities and ionic material generated in the process of attaching the TFT substrate to the color filter substrate, stains resulting from the impurities and ionic materials that may be generated when the two substrates are attached to each other are prevented, thereby improving the picture quality.

It will be apparent to those skilled in the art that various modifications and variations can be made in the separating method and apparatus of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display panel, comprising the steps of:

preparing a TFT substrate having a plurality of electrodes;

preparing a color filter substrate having a color filter layer, a black matrix layer, and an overcoat layer;

forming a groove adjacent an edge of the overcoat layer of the color filter substrate;

forming a double sealant at the sides of the groove in the overcoat layer;

forming a liquid crystal layer on at least one of the TFT substrate and the color filter substrate; and attaching the TFT substrate to the color filter substrate.

2. The method according to claim 1, wherein the step of preparing the TFT substrate includes:

forming gate lines on an insulating substrate;

forming data lines so as to cross the gate lines on the insulating substrate;

forming a TFT at each intersection of the gate lines and data lines, the TFT having a gate electrode and source and drain electrodes; and forming a pixel electrode connected to the drain electrode of the TFT.

3. The method according to claim 1, wherein the step of preparing the color filter substrate includes:

forming color filter patterns on an insulating substrate;

forming the black matrix layer adjacent the color filter patterns;

thereafter forming the overcoat layer on the entire surface of the insulating substrate; and forming a common electrode on the overcoat layer.

4. The method according to claim 1, wherein the overcoat layer includes at least one of an acryl-based resin and a polyimide-based resin.

5. The method according to claim 1, wherein the step of forming the liquid crystal layer includes dispersing a liquid crystal on at least one of the TFT substrate and the color filter substrate.

6. The method according to claim 1, wherein the step of forming the liquid crystal layer includes coating a liquid crystal on at least one of the TFT substrate and the color filter substrate.

7. The method according to claim 1, wherein the liquid crystal layer is formed prior to attaching the TFT substrate to the color filter substrate.

8. The method according to claim 1, wherein the groove is formed by selectively etching the overcoat layer.

9. A method for fabricating a liquid crystal display panel, comprising the steps of:
- preparing a first substrate having a groove on a surface at the periphery;
- forming sealant ridges at both sides of the groove on the first substrate;
- preparing a second substrate;
- coating a liquid crystal on at least one of said surface of the first substrate and a surface of the second substrate; and
- attaching the first substrate to the second substrate so that the surface of the first substrate having the groove faces the second substrate and that the top of each sealant ridge on the first substrate is attached to the second substrate to seal the liquid crystal.

10. A liquid crystal display panel, comprising:
- a first substrate having a groove on a surface at its periphery;
- a second substrate that is coupled to the first substrate via sealants, the surface of the first substrate having the groove facing the second substrate, the sealants being disposed along and at both sides of the groove; and
- a liquid crystal between the first substrate and the second substrate, the liquid crystal being sealed via the sealants.

* * * * *